(12) United States Patent
Friedrich et al.

(10) Patent No.: US 11,358,651 B2
(45) Date of Patent: Jun. 14, 2022

(54) STRUCTURAL COMPONENT

(71) Applicant: HBPO GmbH, Lippstadt (DE)

(72) Inventors: Jonathan Friedrich, Wickede (DE); Frank Schäfergockel, Paderborn (DE)

(73) Assignee: HBPO GmbH, Lippstadt (DE)

( * ) Notice: Subject to any disclaimer, the term of this patent is extended or adjusted under 35 U.S.C. 154(b) by 0 days.

(21) Appl. No.: 17/256,122

(22) PCT Filed: Jul. 2, 2019

(86) PCT No.: PCT/EP2019/067714
§ 371 (c)(1),
(2) Date: Dec. 24, 2020

(87) PCT Pub. No.: WO2020/007851
PCT Pub. Date: Jan. 9, 2020

(65) Prior Publication Data
US 2021/0122426 A1 Apr. 29, 2021

(30) Foreign Application Priority Data
Jul. 5, 2018 (DE) .......................... 202018103848.6

(51) Int. Cl.
*B62D 25/08* (2006.01)
*B62D 29/00* (2006.01)
*B62D 27/02* (2006.01)

(52) U.S. Cl.
CPC .......... *B62D 25/084* (2013.01); *B62D 29/004* (2013.01); *B62D 25/085* (2013.01); *B62D 27/023* (2013.01)

(58) Field of Classification Search
CPC ... B62D 29/004; B62D 25/084; B62D 25/085
See application file for complete search history.

(56) References Cited

U.S. PATENT DOCUMENTS 4,976,490 A * 12/1990 Gentle ................. B29C 70/023
296/183.1
6,216,810 B1 * 4/2001 Nakai ................. B29C 37/0085
180/68.4
(Continued)

FOREIGN PATENT DOCUMENTS

CN 107985418 A 5/2018
DE 102011117951 A1 5/2012
(Continued)

OTHER PUBLICATIONS

WIPO, International Search Report (on a related application), dated Sep. 25, 2019.

*Primary Examiner* — Jason S Morrow
(74) *Attorney, Agent, or Firm* — Laurence P. Colton; Smith Tempel Blaha LLC

(57) ABSTRACT

A motor vehicle front end having a structural component that has a first structural element for absorbing mechanical forces. The first structural element surrounds a spatial region, at least in part, such that a cavity is formed in the interior of the first structural element. The first structural element has a surface region that defines said cavity. The structural component has at least one second structural element which is connected to the first structural element. For the purpose of mechanical reinforcement of the first structural element, the structural component has at least one reinforcing element. The reinforcing element supports a portion of the surface region. The first structural element is composed of at least two separate structural element parts.

6 Claims, 2 Drawing Sheets

(56) References Cited

U.S. PATENT DOCUMENTS

| | | | | |
|---|---|---|---|---|
| 7,287,613 | B2* | 10/2007 | Kim | B62D 29/001 |
| | | | | 180/68.4 |
| 7,445,274 | B2* | 11/2008 | Feith | B62D 25/142 |
| | | | | 296/193.02 |
| 8,262,155 | B2* | 9/2012 | Leanza | B62D 29/004 |
| | | | | 296/205 |
| 8,398,138 | B2* | 3/2013 | Mildner | B62D 29/004 |
| | | | | 296/29 |
| 10,472,002 | B2* | 11/2019 | Jaunasse | B29C 70/885 |
| 2008/0116701 | A1* | 5/2008 | Boumaza | B29C 45/14311 |
| | | | | 293/120 |
| 2012/0219748 | A1* | 8/2012 | Gillard | B60J 5/107 |
| | | | | 428/76 |

FOREIGN PATENT DOCUMENTS

| | | |
|---|---|---|
| JP | H0467190 U | 6/1992 |
| JP | H1081259 A | 3/1998 |
| JP | 2010143461 A | 7/2010 |
| WO | 2016079404 A1 | 5/2016 |

* cited by examiner

STRUCTURAL COMPONENT

CROSS REFERENCE TO RELATED APPLICATIONS

This application is the US National Phase of and claims the benefit of and priority on International Application No. PCT/EP2019/067714 having a filing date of 2 Jul. 2019, which claims priority on and the benefit of German Patent Application No. 20 2018 103 848.6 having a filing date of 5 Jul. 2018.

BACKGROUND OF THE INVENTION

Technical Field

The invention relates to a structural component, in particular for a motor vehicle front end, and to a motor vehicle front end.

Prior Art

Structural components of the type in question are required in a plurality of fields of application. They are used for absorbing and transmitting mechanical forces, and for interconnecting other components and/or modules. In many applications, it is desirable to achieve a high degree of rigidity of the structural component, while at the same time having a low weight, and simultaneously to ensure a high degree of functionality, in particular with respect to the possibility of connecting the structural component to other components or modules.

In this connection, structural components have been proven which comprise a structural element that surrounds a spatial region, at least in part, and thus forms a cavity. Owing to the shaping thereof, structural components of this kind exhibit a comparatively high degree of rigidity. In this case, the rigidity is greater, the larger the spatial region is that is surrounded at least in part. This is in particular because structures of this kind having a cavity that is surrounded at least in part have relatively high second moments of inertia compared with solid elements.

Significant functional requirements are also often made of structural components of this kind, which requirements result in particular requirements for the shaping. In order to be able to reconcile these requirements with the requirements of a low weight and a high degree of rigidity, which can be achieved by the above-described structural elements having cavities, the structural components of the type in question comprise a second structural element. Said second structural element is connected to the first structural element. In this case, an interface forms in the region of the connection between the first structural element and the second structural element. Mechanical forces can be transmitted between the structural elements, via said interface. It is possible, in this way, for an optimized structural component to be developed which is suitable, at a low weight, for absorbing comparatively high forces, but at the same time can be designed in a flexible manner, with respect to its geometry, in such a way that it is possible to fulfill a plurality of geometrical requirements.

However, a disadvantage in the case of structural elements having cavities is that they are often sensitive, for example to a locally concentrated introduction of forces. This results in particular from the fact that the shaping of the first structural elements is favorable with respect to the rigidity in particular if the volume of the cavity surrounded by the first structural element is as large as possible. At the same weight of the first structural element, this then requires comparatively thin wall thicknesses of the regions of the first structural element that adjoin the cavity. These are already susceptible to the forces and/or pressures introduced locally into the first structural element, even during production of the structural component.

BRIEF SUMMARY OF THE INVENTION

The object of the invention is therefore that of proposing a structural component or a motor vehicle front end comprising a structural component, and a method for producing a structural component, in which the above-mentioned disadvantages do not arise, or at least arise to a reduced extent.

The object is achieved by a structural component, in particular for a motor vehicle body, comprising a first structural element for absorbing mechanical forces, wherein the first structural element surrounds a spatial region, at least in part, such that a cavity is formed in the interior of the first structural element, wherein the first structural element comprises a surface region that defines said cavity, wherein the structural component comprises at least one second structural element, wherein the second structural element is connected to the first structural element, wherein the structural component comprises at least one reinforcing element for mechanical reinforcement of the first structural element, wherein the reinforcing element supports a portion of the surface region, wherein the first structural element is composed of at least two separate structural element parts.

The object also is achieved by a motor vehicle front end comprising a structural component comprising a first structural element for absorbing mechanical forces, wherein the first structural element surrounds a spatial region, at least in part, such that a cavity is formed in the interior of the first structural element, wherein the first structural element comprises a surface region that defines said cavity, wherein the structural component comprises at least one second structural element, wherein the second structural element is connected to the first structural element, wherein the structural component comprises at least one reinforcing element for mechanical reinforcement of the first structural element, wherein the reinforcing element supports a portion of the surface region, wherein the first structural element (2) is composed of at least two separate structural element parts.

The features of the dependent claims relate to advantageous embodiments.

According to the invention, the object is achieved in that a structural component comprises a reinforcing element for mechanical reinforcement of the structural component. In this case, the reinforcing element supports a portion of a surface region which faces towards the spatial region that is surrounded by the structural element at least in part. For this purpose, a structural component according to the invention comprises a first structural element for absorbing mechanical forces, the first structural element surrounding a spatial region, at least in part, such that a cavity is formed in the interior of the first structural element. The first structural element further comprises a surface region that defines said cavity. The structural component furthermore comprises a second structural element, the second structural element being connected to the first structural element. Furthermore, at least one reinforcing element is provided which mechanically reinforces the first structural element, the reinforcing element supporting a portion of the surface region. According to the invention, the first structural element is composed of at least two separate structural element parts.

This makes it possible for forces that are introduced into the first structural element via the interface, i.e. in particular the surface which forms an interface in the region of the connection between the first structural element and the second structural element, to be absorbed by the reinforcing element. The same in principle also applies for forces which are introduced into the first structural element during the intended use of the structural component according to the invention. However, the support, according to the invention, of the portion of the surface region by the reinforcing element, is particularly advantageous within the context of the production of the structural component.

In this case, it is possible for forces introduced into the first structural element or into the structural element parts thereof to already be absorbed when producing the structural component, in particular when connecting the first structural element, in particular the two structural element parts, to the second structural element. This can already take place for example when forming an interface. In an extreme case, collapse of the cavity owing to forces and/or pressures acting on the first structural element or the structural element parts thereof, in the region of the interface, is thus prevented.

An essential advantage of the structural components according to the invention is that the mechanical properties can be optimized by selecting suitable materials for the first structural element or the structural element parts thereof, and the second structural element. As a result, the first structural element or the structural element parts thereof can consist, for example, of a metal material. Metal materials, e.g. a metal such as a sheet metal, are characterized by a high degree of stiffness and good durability. Hollow structures formed thereby are well-suited for use as load-bearing components which bridge particular stretches. Alternatively or in addition, it is also possible for the first structural element or the structural element parts to comprise a plastics material.

In this case, the reinforcing element and the two structural element parts of the first structural element are interconnected via the second structural element. For this purpose, it is possible in particular for the reinforcing element and the two structural element parts of the first structural element to each comprise an opening and/or a recess. It is possible, in this way, for the individual structural elements to be interconnected.

According to a preferred embodiment, a first region of the second structural element is arranged in the interior of the cavity, such that it forms an undercut of the second structural element with the first structural element, and/or an anchoring of the second structural element in the first structural element. A connection of this kind allows for better force introduction from the second structural element into the first structural element. In this case, the first structural element preferably comprises, or the structural element parts thereof preferably comprise, an opening through which some of the material of the second structural element penetrates into the cavity. This part of the material then has a spatial extension, within the cavity, which prevents the first region from leaving the cavity through the opening. In this case, the first region preferably rests on a part of the surface of the first structural element that faces the cavity.

Preferably, the first region and/or a second region, arranged inside the cavity, of the second structural element interact(s) with the reinforcing element in such a way as to prevent a movement of the reinforcing element in the first structural element. For this purpose, the first and/or the second region preferably interact(s) with the reinforcing element in an interlocking manner. Prevention of the movement of the first reinforcing element in the first structural element, by the first and/or second region, is expedient in particular if the reinforcing element is intended to absorb forced introduced into the first structural element not only during production of the structural component according to the invention, but also during the intended use of the structural component according to the invention.

Advantageously, the reinforcing element forms the negative form for the first and/or second region. This is advantageous in particular if the second structural element is produced using a primary shaping method. In this manner, the material of the second structural element can penetrate into the cavity during production of the structural component according to the invention, and obtains the desired shape there, using the reinforcing element.

For this purpose it is possible, according to an advantageous embodiment of the present invention, for the at least one second structural element to extend through the openings and/or recesses. This can take place, in particular when the second structural element is formed as a plastics part, for example in that the second structural element is injected through the openings and/or recesses. In this way, the second structural element interconnects reinforcing element(s) and the structural element parts of the first structural element.

According to a particular embodiment it is possible, for this purpose, for the opening provided in the reinforcing element to be formed as a channel. A channel of this kind can pass through the reinforcing element in particular over the entire length thereof, and thus establish a particularly close connection of all components, in particular in the case of injection of the second structural element through the channel.

In this case, the material selection for the reinforcing element is at the discretion of a person skilled in the art; according to a preferred embodiment the reinforcing element comprises a metal, in particular sheet metal, and/or a plastics material, in particular PA.

Advantageously, the material of the second structural element is or comprises a plastics material. The plastics material can in particular be PA. Plastics materials are advantageous in that they can be made into a very wide range of shapes. Thus, the second structural element can be produced for example by means of an injection molding process or a compression molding process. Alternatively and/or in addition, physical or chemical foaming processes can also be used.

It is likewise possible to produce the second structural element from a metal material. In particular light metals, such as magnesium or aluminum, are suitable for this purpose. In the case of metal materials, preferably casting processes, in particular pressure casting processes, are possible for producing the second structural element.

The second structural element preferably comprises a connection region for connecting the structural component to a further component. Connection regions of this kind are used for connecting the component according to the invention to other components. In simple cases, connection regions of the type in question can be designed for example as drilled holes. However, more complex designs of a connection region are also possible. It is thus possible, for example, for threads and/or guide elements to be introduced into the structural element or the structural element parts, and/or formed thereon. Connection regions of this kind substantially increase the functionality of the structural component according to the invention.

In this case, it is particularly advantageous for the connection region to be arranged in the region of the reinforcing element, in particular with respect to the main extension direction of the first structural element. This has the particular advantage that forces which are introduced into the second structural element via the connection region and are transferred to the first structural element via the interface can be absorbed or supported by the reinforcing element. In this case, the spatial closeness between the connection region and the reinforcing element causes a comparatively direct, and thus particularly favorable, introduction of force into the reinforcing element.

In this case, the main extension direction of the first structural element is to be understood in particular to mean the spatial direction in which the first structural element has its greatest spatial extension.

Advantageously, the structural element is part of a motor vehicle front end. A motor vehicle front end is intended to mean pre-assembled modules which form the front region of a motor vehicle. Motor vehicle front ends are preferably pre-assembled separately from the motor vehicle, and connected to the motor vehicle at a later point in time. In this case, a motor vehicle front end can contain various functional structural elements, for example radiators, bonnet locks, headlights and other illumination elements, sensors, for example for temperatures or parking assist systems, and crash absorption elements.

In this case, the structural component according to the invention preferably forms the installation support of the motor vehicle front end. In the case of motor vehicle front ends, installation supports constitute the essential structural component. They extend in the vehicle transverse direction and vehicle height direction, over large parts of the motor vehicle front end. The functional components of the motor vehicle front end are fastened on the installation support during installation of the motor vehicle front end. Accordingly, strict requirements are place on installation supports of this kind, with respect to the mechanical properties thereof, and in addition the installation supports must fulfill a plurality of functional tasks. This often requires complex shaping of the installation support. A structural component according to the invention can therefore be used particularly advantageously as an installation support.

Preferably, the main extension of the first structural element is oriented so as to be at least substantially in parallel with the transverse direction of the motor vehicle front end, i.e. the motor vehicle transverse direction. In particular when used as an installation support, the motor vehicle transverse direction is the direction in which, in the case of a motor vehicle front end, the largest lengths have to be spanned. Load-bearing components having an orientation of this kind, in the region of a motor vehicle front end, are also referred to as crossmembers. They can be part of an installation support, or designed as separate components. Owing to the high degree of rigidity thereof, the first structural element is therefore suitable in particular for use as a crossmember.

The above-described invention can also be used in a method. According to the method for producing a structural component according to the invention, initially a first structural element is provided. The first structural element surrounds a spatial region, at least in part. As a result, a cavity is formed in the interior of the first structural element. The first structural element comprises a surface region that defines said cavity. In this case, the first structural element comprises a reinforcing element which supports a portion of said surface region.

According to the method according to the invention, a second structural element is molded onto said first structural element. In this case, an interface between the first structural element and the second structural element results in the region of the reinforcing element. An integrally bonded connection between the first structural element and the second structural element can result at said interface. It is advantageous for the second structural element to be molded onto the first structural element by means of a primary shaping process.

It is particularly advantageous, in this connection, for the second structural element to be molded onto the first structural element by means of an injection molding process. In this case, the first structural element can be received in the injection mold. The first structural element can, however, also be received in the injection mold only in part. The latter situation is advantageous for example if the first structural element is of an elongate shape, but the second structural element extends merely over a portion of the first structural element, in the main extension direction of the first structural element.

Of course, both in view of the structural component according to the invention and in view of the described method, the structural component can comprise further structural elements, in addition to the second structural element. The further structural components can have the features of the second structural element.

BRIEF DESCRIPTION OF THE DRAWINGS

The invention will be explained, schematically, in greater detail in the following, with reference to FIGS. 1 and 2.

DETAILED DESCRIPTION OF PREFERRED EMBODIMENTS

Figure 1:
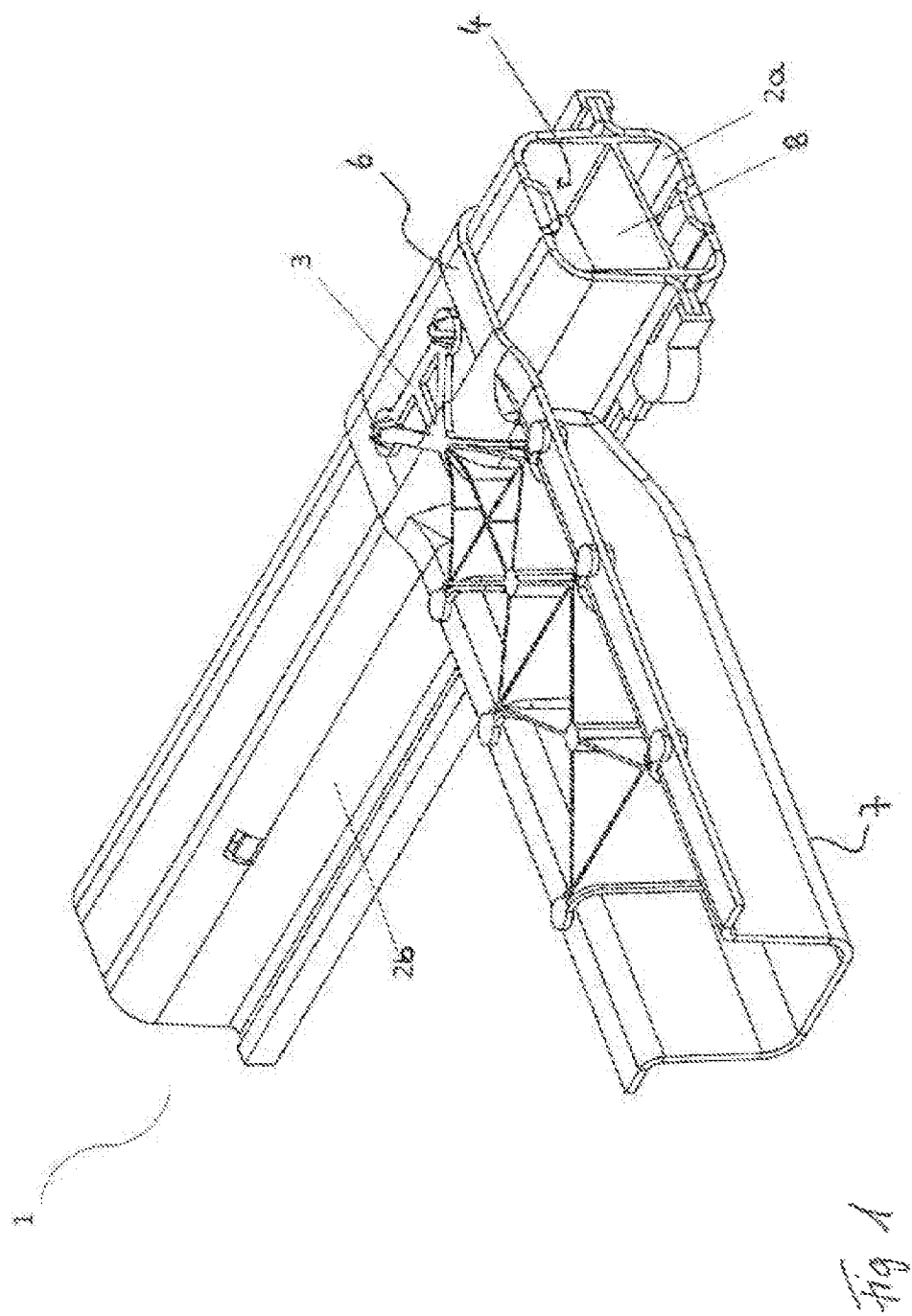
FIG. 1 is a perspective view of a structural component according to the invention, given by way of example.

The structural component 1 shown in FIG. 1 comprises a first structural element 2 for absorbing mechanical forces. The structural element 2 is composed of two separate structural element parts 2a, 2b, which together surround a spatial region, at least in part, such that a cavity 4 is formed in the interior. The structural component 1 also comprises a second structural element 3 which is connected to the first structural element 2. The structural component 1, shown here by way of example, further comprises an inner reinforcing element 8 which is arranged in the interior 4 of the first structural element 2, and an outer reinforcing element 6 which surrounds the first structural element 2, at least in part. The reinforcing element 6 transitions into a U-shaped structural element 7 on the side facing away from the first structural element 2.

Figure 2:
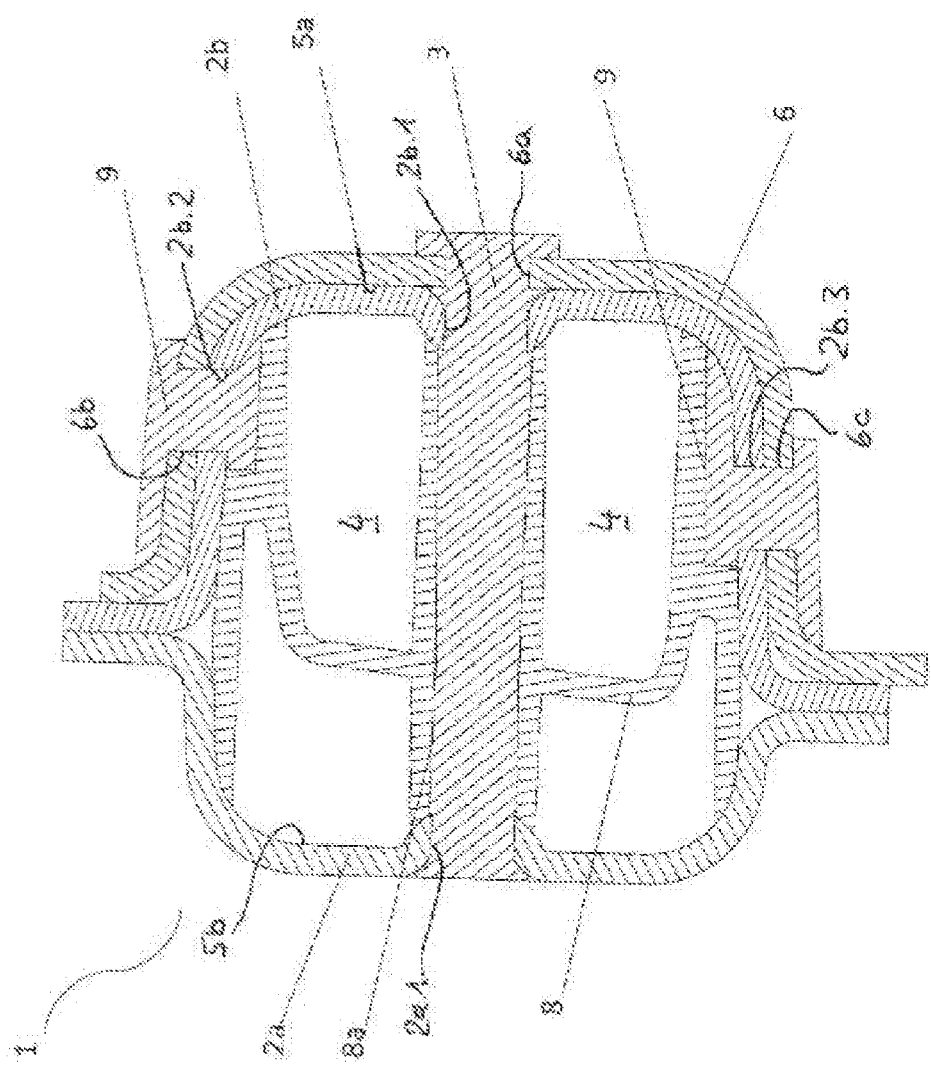
FIG. 2 is a cross-sectional view, given by way of example, of a part of the structural component according to the invention, given by way of example, shown in FIG. 1.

Further details are explained in greater detail with reference to the cross-sectional view in FIG. 2. The section through the first structural element 2 is taken at the location at which the second structural element 3 penetrates the first structural element 2. The two structural element parts 2a, 2b surround a cavity 4 in which the reinforcing element 8 is arranged. In this case, the reinforcing element 8 rests on the inner surface region 5b of the first structural element 2, at least in part, and thus establishes surface contact therewith, such that it can absorb forces which act on the first structural element 2. The reinforcing element 6 rests on the structural element part 2b on the outside of the outer surface region 5a, and can thus absorb forces from the first structural element 2 or deliver them thereto.

In the region of the penetration of the first structural element 2 through the second structural element 3, both the first structural element 2 and the two reinforcing elements 6, 8 comprise flush openings 2a.1, 2b.1, 6a, 8a. An end of the second structural element 3 is guided through said openings 2a.1, 2b.1, 6a, 8a and fastened in an interlocking manner.

It is thus possible, for example, for the second structural element 3 to be a plastics injection molded part which is injected through the openings 2a.1, 2b.1, 6a, 8a, and thus the combination consisting of the second structural element 2 and the two structural element parts 2a, 2b, and the reinforcing elements 6, 8 is held together by the undercuts in the region of the opening 2a.1, between the openings 2b.1 and 6a or outside the opening 6a. It is also possible for the second structural element 3 to be a preformed plastics part which is inserted into the openings 2a.1, 2b.1, 6a, 8a and is then softened, for example by means of an ultrasonic welding device, and molded onto the contours of the first structural element 2 and reinforcing elements 6, 8. Other interlocking connections are also possible.

This interlocking arrangement ensures that the reinforcing elements 6, 8 are retained so as to be in surface contact with the first structural element 2, and thus lead to rigidification of the structural component 1.

Furthermore, this sectional view shows, in each case, two flush openings 6b, 2b.2 and 2b.3, 6c. The second structural element 9 is arranged in an interlocking manner through said openings 2b.2, 2b.3, 6b, 6c. The second structural element 9 is preferably an injection molded part, but other ways of constructing the second structural element 9 are also possible. The second structural element 9 thus connects the reinforcing element 6 to the structural element part 2b and the inner reinforcing element 8.

The structural component 1 thus created is characterized by significant lightness, a high degree of rigidity of the structural component 1 being achieved by the reinforcements 6, 8 being in contact, at least in part.

The structural component 1 thus created can be installed anywhere that a high degree of rigidity is required, at a low weight. The structural component 1 can be used for example as an installation support, in particular in vehicle construction, in particular in the motor vehicle front end region.

The invention claimed is:

1. A motor vehicle front end, comprising a structural component (1) comprising a first structural element (2) for absorbing mechanical forces, wherein the first structural element (2) surrounds a spatial region, at least in part, such that a cavity (4) is formed in the interior of the first structural element (2), wherein the first structural element (2) comprises a surface region (5a, 5b) that defines said cavity (4), wherein the structural component (1) comprises at least one second structural element (3, 9), wherein the second structural element (3) is connected to the first structural element (2), wherein the structural component (1) comprises at least one reinforcing element (8, 6) for mechanical reinforcement of the first structural element (2), wherein the reinforcing element (6) supports a portion of the surface region (5a, 5b), wherein the first structural element (2) is composed of at least two separate structural element parts (2a, 2b), wherein the reinforcing element (6, 8) and the two structural element parts (2a, 2b) of the first structural element (2) are interconnected via the second structural element (3, 9), wherein the reinforcing element (6, 8) and the two structural element parts (2a, 2b) of the first structural element (2) each comprise an opening (6a, 8a or 2a.1, 2b.1) and/or recess, wherein the second structural element (3, 9) comprises a plastics material, and wherein the at least one second structural element (3, 9) is injected through the openings and/or recesses, and thus interconnects reinforcing element(s) (6, 8) and the two structural element parts (2a, 2b) of the first structural element (2).

2. The motor vehicle front end according to claim 1, wherein the opening provided in the reinforcing element (8) is formed as a channel.

3. The motor vehicle front end according to claim 1, wherein the structural element parts (2a, 2b) of the first structural element (2) comprise a metal and/or a polyamide.

4. The motor vehicle front end according to claim 1, wherein the reinforcing element (6, 8) comprises a metal and/or a polyamide.

5. The motor vehicle front end according to claim 1, wherein the structural component (1) is an installation support.

6. The motor vehicle front end according to claim 1, wherein the main extension direction (X) of the first structural element (2) is oriented so as to be at least substantially in parallel with the transverse direction of the motor vehicle front end.

* * * * *